May 4, 1943.　　　G. SCHWARZBACH　　　2,318,186
AUTOMATIC TRANSMISSION
Filed Jan. 3, 1942　　　2 Sheets-Sheet 1
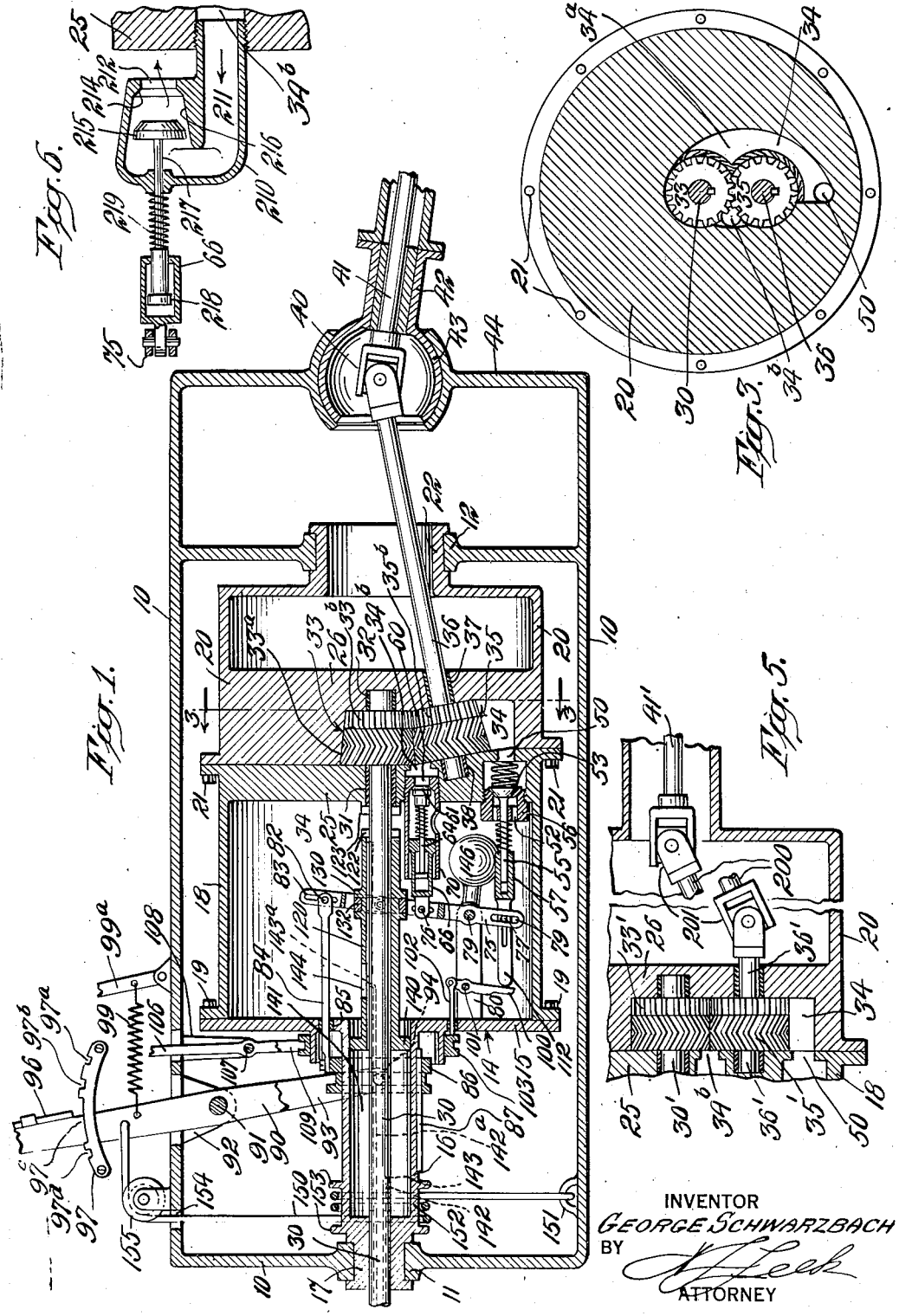
INVENTOR
GEORGE SCHWARZBACH
BY
ATTORNEY May 4, 1943.     G. SCHWARZBACH     2,318,186
AUTOMATIC TRANSMISSION
Filed Jan. 3, 1942      2 Sheets-Sheet 2
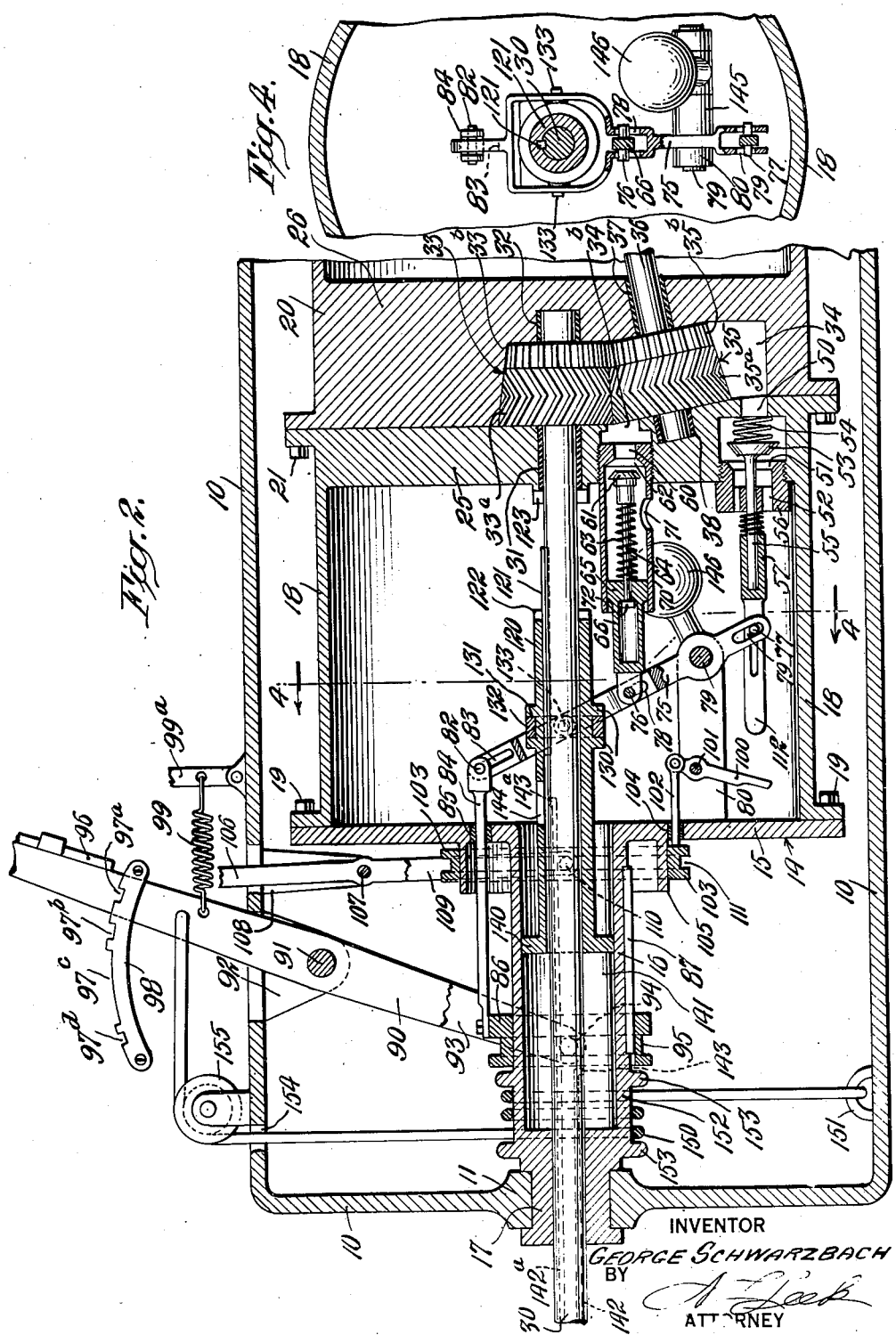
INVENTOR
GEORGE SCHWARZBACH
BY
ATTORNEY Patented May 4, 1943

2,318,186

UNITED STATES PATENT OFFICE 2,318,186

AUTOMATIC TRANSMISSION

George Schwarzbach, Brooklyn, N. Y.

Application January 3, 1942, Serial No. 425,496

16 Claims. (Cl. 74—293)

This invention relates to automatic transmissions for vehicles and more particularly to a transmission gearing having hydraulic mechanism arranged to effect an infinite variation in driving ratios.

An object of the present invention is to provide a novel and improved transmission of the type above indicated.

Another object is to provide a transmission of the above type in which fluid pressure is utilized for controlling the driving ratio.

Another object is to provide a transmission of the above type in which the driving ratio is automatically varied in accordance with the power requirements.

Another object is to provide a transmission of the above type which may be controlled manually or automatically.

Another object is to provide a transmission of the above type having a selective free-wheeling control and a manually controlled reversing mechanism.

Another object is to provide a transmission of the above type suited to commercial production and operation.

Various other objects and advantages will be apparent as the nature of the invention is more fully disclosed.

The invention will be better understood by referring to the following description, taken in connection with the accompanying drawings in which a specific embodiment thereof has been set forth for purposes of illustration.

In the drawings,

Fig. 1 is a longitudinal section through a transmission embodying the present invention;

Fig. 2 is an enlarged sectional view of a portion of the mechanism of Fig. 1 showing the transmission in reverse position;

Fig. 3 is a transverse section taken on the line 3—3 of Fig. 1 showing the gear pump;

Fig. 4 is a partial transverse section taken on the line 4—4 of Fig. 2;

Fig. 5 is a partial detail view illustrating a different embodiment of the invention; and Fig. 6 is a partial section showing a different type of valve to be used in the transmission of Fig. 1.

Referring to the drawings more in detail, the transmission is shown as comprising a stationary housing 10 having a front bearing 11 and a rear bearing 12 in which a rotatable housing 14 is journalled. The rotatable housing 14 comprises a front plate 15 having an elongated hub portion 16 and terminating in a bearing member 17, a central cylindrical section 18 secured to the front plate 15 by bolts 19 and a rear cylindrical section 20 secured to the central cylindrical section 18 by bolts 21 and having a rear bearing member 22. The sections 18 and 20 have contiguous end walls 25 and 26 respectively forming a gear chamber to be described.

A driving shaft 30 is journalled in the bearing member 17 of the rotating housing 14, extends through the hub portion 16 and the cylindrical section 18 and is journalled at its free end by bearings 31 and 32 in the end walls 25 and 26. The shaft 30 carries a sun gear 33 which is mounted in a gear chamber 34 (Fig. 3) formed in the end wall 26. A planet gear 35 is also mounted in the gear chamber 34 on a shaft 36 which is journalled in bearings 37 and 38 in the walls 26 and 27 respectively and extends through the rear bearing member 22 of the rotating housing 14 to a universal joint 40. The universal joint 40 is connected to a propeller shaft 41 which is journalled in a housing 42 having an adjustable spherical bearing member 43 mounted in a bracket 44 carried by the stationary housing 10. The adjustable bearing permits the angular position of the propeller shaft to vary according to conditions of use. The mechanism thus far described constitutes a planetary transmission, the driving ratio of which is determined by the speed of rotation of the rotating housing 14 with respect to the sun gear 33.

The gear chamber 34 is divided by the gears 33 and 35 into a pair of chambers 34a and 34b, the flow of fluid between which is controlled by the rotation of the gears 33 and 35 acting as a gear pump. The chamber 34a is provided with an inlet port 50 and a valve seat 51 having a port 52 communicating therewith. The port 52 is closed by a spring actuated valve 53 which is normally held by spring 54 against the seat 51 and serves as a combined relief and pressure control valve. The valve 53 is provided with a stem 55 which extends through a supporting member 56 and is actuated by a sleeve 57 to be described.

The chamber 34b is provided with an outlet port 60 which is normally closed by a valve 61 engaging a valve seat 62 and is held in closed position by a spring 63. The valve 61 is provided with a stem 64 which extends through the head 65 of a sleeve 66. The head 65 is slidable in a cylinder 70 communicating with the port 60 and provided with an aperture 71 through which fluid passes to the interior of the rotating housing 14. The stem 64 is provided with a head 72 slidable in the sleeve 66.

The sleeve 66 and the sleeve 57 are actuated by a lever 75 to which they are connected by pins 76 and 77 engaging slots 78 and 79 respectively in said lever. The lever 75 is pivoted at 79 to a bracket 80 attached to the front plate 15. The free end of the lever 75 is connected by a pin 82, operating in a slot 83 in said lever, to a rod 84 which extends through a bushing 85 in the front plate 15 and is attached to a collar 86 which is mounted for sliding movement axially on the hub 16 to which it is keyed by a key 87 against relative rotational movement. The collar 86 is actuated by a hand lever 90 which is pivoted at 91 to a bracket 92 attached to the stationary housing 10 and is provided at its end with a yoke 93 having pins 94 engaging an annular channel 95 in the collar 86. The lever 90 extends to the outside of the housing 10 into an accessible position for manual operation and may be provided with a manually operated latch 96 engaging recesses 97a to 97d in an arcuate segment 98 to hold the lever in selected positions, to be described. A spring 99 extends between the lever 90 and a lever 99a actuated by a linkage (not shown) from the throttle or accelerator of the engine.

For manually actuating the valve 53 independently of the lever 90 there is provided a lever 100 pivoted at 101 to the bracket 80 and attached by a link 102 to a collar 103. The link 102 extends through a bushing 104 in the front plate 15. The collar 103 is mounted for slidable axial movement on a sleeve 105 which is formed as a part of the front plate 15. A manual lever 106 pivoted at 107 to a bracket 108 attached to the fixed housing 10 is provided with a yoke 109 having pins 110 which engage an arcuate slot 111 in the collar 103 for actuating the same. The lever 106 extends through the stationary housing 10 to an accessible position. The lever 100 is adapted to engage the end of a pin 112 which is formed as a part of or attached to the sleeve 57.

For obtaining a direct drive when desired, a sleeve 120 is keyed to the shaft 30 by a key 121 and is adapted for axial movement thereon. The sleeve 120 is provided at its end with a set of clutch teeth 122 which are adapted to engage a similar set of teeth 123 formed as a part of or secured to the wall 25. The sleeve 120 is provided with a pair of flanges 130 forming a channel 131 therebetween in which a ring 132 is journalled. The ring 132 is secured by pins 133 to the lever 75 whereby the sleeve 120 is actuated in accordance with the position of this lever. The sleeve 120 is also provided with a head 140 which is slidable in the hub 16 and forms therein a chamber 141. The shaft 30 may be drilled to provide an oil duct 142 leading from the engine and terminating in a port 143 communicating with the chamber 141 so that oil pressure from the engine acts on the head 140 to cause movement of the sleeve 120 into engaging position. A duct 142a may also be provided, terminating in a port 143a registering with an aperture 144 in the sleeve 120. The duct 142a may lead to the crank case to drain oil from the housing 14 and to prevent an air lock being formed in the upper part thereof.

The lever 75 carries a sleeve 145 (Fig. 4) which is also journalled about the pin 79 and carries a governor weight 146 which is mounted so that rotation of the rotating housing 14 about the axis of the shaft 30 tends to move the lever 75 in a clockwise direction to thereby increase the pressure exerted by the spring 64 on the valve 61.

For locking the rotating housing 14 against rotation for the purpose of reversing the drive, a brake band comprising a flexible member 150 is provided which is attached to a suitable anchor 151 secured to the stationary housing 10 and extends in a plurality of turns around a drum 152 formed on the hub 16 between flanges 153, then through an aperture 154 in the stationary housing 10 and around a pulley 155 and is secured to the lever 90 so that the member 150 is tightened about the drum 152 when the lever 90 is moved in a clockwise direction to its extreme position.

The gears 33 and 35 are preferably formed in two parts, 33a, 33b and 35a, 35b respectively. The portions 33a and 35a are shown as gears of the herring bone type and are so arranged as to form a gear pump as above described. Due to the substantial film of oil which must be handled by the gears of the gear pump, the gears 33a and 35a, taken by themselves, are subject to chattering. In order to avoid this the sections 33b and 35b are provided which are in the nature of spur gears and are so designed as to provide substantially less clearance than the clearance between the teeth of the gears 33a and 35a. It is to be understood, of course, that if the gears 33a and 35a are so arranged as to prevent chattering, the sections 33b and 35b may be omitted and the gears formed each as a single element. The gear pump may be of any standard type such as spur gears, herring bone gears or cooperating cams.

*Operation*

In operation this device may be considered as applied to the propulsion of a vehicle powered by an internal combustion engine. In this event, the driving shaft 30 is driven by the engine and the driven shaft 41 leads to the usual differential mechanism by which the wheels are driven. In the position shown in Fig. 2 the lever 90 engages the first slot 97a of the segment 98. This is the reversing position. The lever 90 causes the band 152 to be tightened about the drum 150 thereby locking the housing 14 against rotation and causing a direct mechanical drive between the gears 33 and 35 so that the shaft 36 is operated in the opposite direction from the shaft 30 and at a ratio dependent upon the relative sizes of the gears 33 and 35. In the drawings this gear ratio is shown as 1 to 1. In this position of the lever 90 the collar 86 is moved to the left, as viewed in Fig. 2, thereby shifting the lever 75 to its extreme counter-clockwise position in which valves 53 and 61 are both held open, thereby permitting free circulation of fluid from the chamber 34b through the port 60 into the interior of the rotating housing 14, thence through the ports 52 and 50 into the chamber 34a and allowing free rotation of the gears 33 and 35. In this position the transmission operates as a straight mechanical gear reversing transmission.

With the lever 93 engaging the second slot 97b of the segment 98, the mechanism is in neutral. In this position, the band 150 has been loosened from the drum 152, thereby permitting free rotation of the rotating housing 14. The collar 86 has been shifted to the right a small distance and the lever 75 has been shifted in a clockwise direction a slight amount. The amount, however, is not sufficient to close the valves 53 or 61. Hence, free circulation of fluid between the chambers 34a and 34b is still permitted and the housing 14 is permitted to rotate freely. In this position the planet gear 35 rotates around the sun gear 33, causing rotation of the housing 14 at a speed one-half that of the driving shaft 30, the shaft 41 remaining stationary. The transmission is now operating as an unrestrained mechanical planetary transmission.

For forward movement, the latch 96 is released and the lever 90 is left free for movement in response to the automatic mechanism to be described. When the lever 90 is thus released, the spring 63 closes the valve 61 and the spring 54 closes the valve 53, at the same time causing a corresponding movement of the lever 75 and, through the link 84, the lever 90. The spring 54 is a light spring suited to cause the valve 53 to operate as a check valve only so that this valve opens in response to a slight pressure differential to admit fluid from the interior of the rotating housing 14 to the chamber 34a. The valve 61, being closed by the pressure of the spring 63, permits fluid pressure to be built up in the chamber 34b which is determined by the loading of the spring 64. The gears 33 and 35 now act as a gear pump to feed fluid, such as oil, from the chamber 34a to the chamber 34b and to thereby build up a pressure in the chamber 34b until the pressure reaches a value such that the valve 61 is opened against the compression of the spring 63 to permit circulation of fluid to the interior of the housing 14. During this time the casing 14 is rotating due to the planetary action above referred to and the rotation of this casing causes the governor 146 to produce a clockwise rotation of the lever 75 and thereby causes the sleeve 66 to engage the head 65 of the valve stem 64 to exert a loading on the spring 63 determined by the speed of rotation. If the engine is rotating slowly, a light loading is thus exerted on the spring 63 and a low pressure is built up in the chamber 34b. As the engine is speeded up, however, the governor 146 causes an increased fluid pressure to be built up within said chamber 34b. This fluid pressure in the chamber 34b produces a force opposing the rotation of the gears 33 and 35 or, in other words, exerts a drag on said gears, the drag increasing as the speed of rotation of the housing is increased until it reaches a value equal to the power requirement for turning the shaft 41 and starting the vehicle in motion. At the same time the oil pressure built up in the engine due to the operation thereof is supplied through the channels 142 and ports 143 to the chamber 141 and exerts a force against the head 140 which tends to move the sleeve 120 to the right and thereby assists the action of the governor 146. The governor 146 and the cylinder 141 may be so designed as to obtain the necessary power transmission characteristics. They are preferably so designed that the vehicle gradually picks up in speed and the transmission ratio is progressively varied through a continuous range until, at a predetermined engine speed, sufficient pressure is built up in the chamber 34b to substantially lock the gears 33 and 35 against rotation. This is the condition corresponding to direct drive. After this occurs, further movement of the governor 146 will shift the lever 75 and the sleeve 120 to a position where the teeth 122 and 123 intermesh, thereby producing a direct mechanical drive between the shaft 30 and the shaft 41 and eliminating the gears 33 and 35 as power transmission elements. Without this direct connection, the gears 33 and 35 would rotate only an amount sufficient to compensate for the oil leakage, thus producing a slight drift between these gears and the rotating housing 14. This drift, however, would normally be of a minor value and the transmission with the sleeve 120 omitted, would constitute, in effect, a direct hydraulic drive.

In the direct drive position above referred to, the lever 90 is in its extreme counter-clockwise position and the latch 96 is in a position to engage the slot 91d in the segment 98. The transmission may be locked in this position, if desired, by engaging the latch 96, in which event, direct mechanical drive is obtained through the sleeve 120 and the intermeshing gears 122 and 123 until the lever 90 is again released to permit the automatic hydraulic transmission to again come into operation. With the latch 96 engaging the elongated slot 97c in the segment 98, the lever 90 is free to move through the entire range of automatic transmission in response to movement of the governor 146, but is prevented from passing to the direct drive position in which the gears 122 and 123 are intermeshed.

The spring 99 opposes the action of the governor 146 and reduces the loading on the valve 61 when the accelerator or throttle is open, as when a quick pickup is desired. This permits the motor to speed up and attain maximum power conditions before the drag is applied by the fluid pressure. It also increases the driving ratio when the throttle is fully opened as, for example, in driving up a grade where increased power is required and prevents the direct drive condition from being reached at as low a speed as when the throttle is opened to a lesser degree.

Free wheeling may be obtained by engaging the latch 96 in the slot 97b as above mentioned to prevent the direct mechanical connection between the gears 122 and 123 and leaving the mechanism under the control of the hydraulic pressure.

Under free wheeling conditions, that is, when the engine is being driven by the rear wheels, the direction of drift of the gears 33 and 35 with respect to the rotating housing 14 is reversed, thereby causing pressure to be built up in the chamber 34a instead of in the chamber 34b. If now the valve 53 is opened to relieve the pressure in the chamber 34a and provide for free circulation of fluid the gears 33 and 35 are free to rotate with respect to each other and free wheeling conditions exist. To accomplish this, the lever 106 is actuated to shift the lever 100 and thereby open the valve 53 and hold the same open as long as the lever 106 is actuated. The lost motion connection between the head 65 of the stem 64 and the sleeve 66 is such that in this position the valve 61 remains closed. Pressure is thus prevented from building up in the chamber 34a and the gears 33 and 35 are free to rotate without exerting a drag on the engine. However, when the engine is again speeded up to cause pressure to be built up in the chamber 34b, the valves 61 being closed, fluid pressure is built up in the chamber 34b as above mentioned so that the load is again picked up by the engine. When free wheeling conditions are not required, the lever 106 is restored to its original position so that the valve 53 is allowed to close and operate as a check valve to permit circulation of fluid only in one direction, that is, from the interior of the rotating housing 14 into the chamber 34a.

It will be seen that in the above described mechanism, a fully automatic transmission is obtained which is capable of operating in a forward direction through an infinite variation in speed, may be adjusted for free wheeling when desired and may be reversed by simple mechanical means. In all positions when valve 53 is closed the engine may be used as a brake.

The embodiment shown in Fig. 5 operates in the same manner as that above referred to. In this embodiment, however, the shafts 30' and 36' are arranged parallel so that bevelled gears are not required. The gears 33' and 35' of Fig. 5 corresponding to the gears 33 and 35 of Figs. 1 and 2 may accordingly be arranged as the usual unbevelled spur gears. In this embodiment the shaft 36' being parallel to the driven shaft 41' and to the driving shaft 30' and offset therefrom, is connected by means of a link 200 and a pair of universal joints 201 for establishing a driving connection between the shaft 36' and the shaft 41'. The embodiment of Fig. 5 accordingly requires two universals as distinguished from the single universal of Figs. 1 to 4. Otherwise the operation is identical.

In the embodiment of Fig. 6 the port 60 of Fig. 1 is connected to a housing 210 having a U-shaped passage 211 terminating in a valve port 212 which is open to the interior of the housing 14 and is provided with a seat 214 against which a valve 215 is adapted to seat for closing the port. The valve 215 is of the type having an opening proportional to the movement of the valve stem and is shown as provided with a tapered housing 216 for this purpose. The valve 215 is provided with a stem 217 which extends through the housing 210 and is provided with a head 218 which corresponds to the head 72 of the valve stem 64 of Fig. 1. The head 218 is engaged by the sleeve 66 which is connected to the lever 75. A spring 219 tends to hold the valve 215 open.

In this embodiment pressure is built up in the chamber 34b which is dependent upon the speed of operation of the gear pump. The gear pump in turn is dependent upon the relative speeds of the engine (gear 33a) and the vehicle (gear 34a). With the vehicle stationary as in starting, the engine drives the gear 33a and causes fluid to circulate through the passage 211 and the valve port 212 building up a pressure determined by the valve opening and the quantity of flow. As the engine speed increases the fluid pressure increases to exert a drag on the vehicle as described in connection with the embodiment of Fig 1. The characteristics are determined by the design of the tapered housing 216 and the spring loading which may be adapted to produce a pressure varying as any desired function of the pump speed. At a predetermined pressure the valve 215 closes. The operation then corresponds to direct drive with the fluid pressure locking the gears 33 and 34 against relative movement. A safety relief valve (not shown) may be included if desired.

In this embodiment the governor 146 is not required as the speed control effect is automatically obtained by the action of the valve itself. The operation is otherwise identical with that of Fig. 1. The lever 75 permits manual control when desired.

Although a specific embodiment of the invention has been set forth for purposes of illustration, it is to be understood that the invention is not to be restricted thereto, but is only to be limited in accordance with the scope of the following claims.

What is claimed is:

1. A change speed transmission comprising a driving shaft, a driven shaft, planetary gearing comprising a sun gear mounted on one of said shafts, a planet gear mounted on the other of said shafts and a floating rotatable housing carrying said gears mounted for rotation independent of both of said shafts, said housing having a closed gear chamber, said gears being mounted in said chamber to form a gear pump, inlet and outlet ports in said chamber arranged for the circulation of fluid by said gear pump, a pressure control valve to control the fluid pressure built up by said gear pump, a governor mechanism rotating with said housing and connected to control the operation of said valve so as to vary the fluid pressure built up by said gear pump in accordance with the speed of rotation of said housing, said mechanism being so constructed and arranged that the speed of rotation of said housing, and the consequent fluid pressure, varies as a function of the speeds both of the driving shaft and of the driven shaft so that an increase in speed of the driving shaft causes an increased torque to be applied to the driven shaft and an increase in speed of the driven shaft increases the fluid drag on said gear pump until the gears become locked, with the driven shaft, the driving shaft and the housing rotating at the same speed, whereby the transmission ratio progressively decreases from a maximum through a continuous range to a condition of direct drive.

2. A change speed transmission comprising a driving shaft, a driven shaft, planetary gearing interconnecting said shafts having a housing provided with a closed gear chamber, a sun gear and a planet gear in said chamber arranged to constitute a gear pump, one of said shafts being connected to said sun gear, a pressure control valve to control the fluid pressure built up by said gear pump, a governor rotating with said housing and connected to control the operation of said valve so as to vary the fluid pressure in accordance with the speed of rotation of said housing, a releasable direct mechanical clutch connection between the sun gear shaft and said housing, and connections actuated by said governor to engage said clutch at a predetermined speed of rotation of said housing in excess of that corresponding to direct drive conditions.

3. A transmission as set forth in claim 1, in which said sun gear and its shaft, and said casing rotate about a common axis and said planet gear and its shaft rotate about a variable axis which intersects said first axis, a third shaft, and a universal connection at the point of said intersection connecting said third shaft with the planet gear shaft.

4. A transmission as set forth in claim 1, in which said sun gear and its shaft, and said casing rotate about a common axis and said planet gear and its shaft rotate about a variable axis which intersects said first axis, a third shaft, and a universal connection at the point of said intersection connecting said third shaft with the planet gear shift, said third shaft also rotating about a variable axis which intersects said first axis at said universal connection.

5. A transmission as set forth in claim 1 in which said driving shaft is connected to drive said sun gear and said planet gear is connected to drive said driven shaft.

6. In a transmission as set forth in claim 1, a brake to prevent rotation of said housing for reversing said transmission, and mechanism actuated by said brake to hold said pressure control valve in open position so as to release said gears for free rotation.

7. In a transmission as set forth in claim 1, a fluid inlet passage in said housing supplying fluid to said gear pump, a check valve in said inlet passage, a brake connected to lock said housing against rotation for reversing said transmission, and connections between said brake and said valves for holding both the inlet valve and the pressure control valve open when said brake is actuated, for thereby permitting free flow of fluid through said gear.

8. A change speed transmission comprising a driving shaft, a driven shaft, planetary gearing interconnecting said shafts having a housing provided with a closed gear chamber, a sun gear and a planet gear in said chamber arranged to constitute a gear pump, one of said shafts being connected to said sun gear, a pressure control valve to control the fluid pressure built up by said gear pump, a governor rotating with said housing and connected to control the operation of said valve so as to vary the fluid pressure in accordance with the speed of rotation of said housing, said valve being spring biased to closed position and said governor being connected to increase the loading of said valve so that a higher pressure is built up at higher speeds and vice versa, and a spring actuated in accordance with throttle opening connected to oppose the action of said governor and arranged to retard the approach to direct drive conditions when the throttle opening is increased.

9. In a transmission mechanism, a planetary drive comprising a stationary frame, a gear casing mounted to rotate freely in said frame, a sun gear and a planet gear in said casing, a driving shaft for said sun gear and a driven shaft for said planet gear, said driven shaft extending at an angle to the axis of said planetary drive, a propeller shaft, a universal joint at the axis of said planetary drive connecting said propeller shaft to said driven shaft, and a flexible mounting for said propeller shaft to permit angular movement thereof with respect to said transmission.

10. A change speed transmission comprising a driving shaft, a driven shaft, planetary gearing interconnecting said shafts, said gearing comprising a sun gear and a planet gear connected to the respective shafts and a rotatable housing carrying said gears, said housing having a closed gear chamber, said gears being mounted in said chamber to form a gear pump, inlet and outlet ports in said chamber, a return passage in said housing arranged for the circulation of fluid therein by said gear pump, a pressure control valve in said outlet port to control the fluid pressure built up by said gear pump, said valve being spring loaded to open position and closing in response to fluid pressure exerted by said gear pump to thereby allow said pressure to build up to the value required for operating said transmission.

11. A change speed transmission comprising a driving shaft, a driven shaft, planetary gearing interconnecting said shafts having a housing provided with a closed gear chamber, a sun gear and a planet gear in said chamber arranged to constitute a gear pump, one of said shafts being connected to said sun gear, a pressure control valve to control the fluid pressure built up by said gear pump, a governor rotating with said housing and connected to control the operation of said valve so as to vary the fluid pressure in accordance with the speed of rotation of said housing, a fluid inlet passage in said housing supplying fluid to said gear pump, a check-valve in said passage to normally prevent reverse flow of fluid and manual mechanism connected to hold said check valve in open position to permit reverse flow of fluid for free wheeling purposes.

12. A change speed transmission comprising a driving shaft, a driven shaft, planetary gearing interconnecting said shafts having a housing provided with a closed gear chamber, a sun gear and a planet gear in said chamber arranged to constitute a gear pump, one of said shafts being connected to said sun gear, a pressure control valve to control the fluid pressure built up by said gear pump, driving means for said driving shaft, an oil pressure cylinder carrying oil under a pressure built up by said driving means, and means actuated by said oil pressure to control the operation of said valve so as to cause an increased fluid pressure to be built up by said gear pump at increased speeds and vice versa.

13. In a change speed mechanism as set forth in claim 12, spring means biasing said valve to closed position and a governor rotating with said housing and connected to increase the loading on said valve with increase in speed.

14. In a variable speed transmission as set forth in claim 2, selective manual means locking said clutch in engaged position for direct mechanical drive or in disengaged position for fluid drive.

15. In a variable speed transmission as set forth in claim 2, selective manual means locking said clutch in engaged position for direct mechanical drive, in disengaged position for fluid drive, or holding said valve in open position for idling.

16. In a variable speed transmission as set forth in claim 2, selective manual means locking said clutch in engaged position for direct mechanical drive, in disengaged position for fluid drive, holding said valve in open position for idling or for locking said housing against rotation for reverse.

GEORGE SCHWARZBACH.